United States Patent [19]

Schätzler

[11] 4,350,385
[45] Sep. 21, 1982

[54] SLIDING ROOF FOR VEHICLES

[75] Inventor: Walter Schätzler, Aufhausen, Fed. Rep. of Germany

[73] Assignee: Webasto-Werk W. Baier GmbH & Co., Munich, Fed. Rep. of Germany

[21] Appl. No.: 139,410

[22] Filed: Apr. 11, 1980

[30] Foreign Application Priority Data

Apr. 12, 1979 [DE] Fed. Rep. of Germany ... 7910778[U]

[51] Int. Cl.³ .............................................. B60J 7/04
[52] U.S. Cl. .................................................. 296/222
[58] Field of Search ............... 296/222, 216, 223, 224

[56] References Cited

U.S. PATENT DOCUMENTS

| | | | |
|---|---|---|---|
| 4,159,144 | 6/1979 | Ehlen et al. | 296/222 |
| 4,210,359 | 7/1980 | Mori | 296/222 |
| 4,223,942 | 9/1980 | DeLuca | 296/222 |
| 4,229,037 | 10/1980 | Vermeulen | 296/222 |
| 4,254,989 | 3/1981 | Schatzler | 296/216 |

Primary Examiner—Robert R. Song
Attorney, Agent, or Firm—Craig and Antonelli

[57] ABSTRACT

A sliding roof for automobiles with a sliding top for closing a roof aperture in its closed position and which can be selectively lowered from its closed position and pushed underneath a fixed rearward roof section or can be swung out in an upward direction is provided with constraining or guide plates which are adjustable in the longitudinal direction of lateral guides for the sliding top. During closing of the sliding top, a guide member fixedly joined to the sliding top contacts these guide plates to direct the closed sliding top into its forward end position. Since these guide plates must be set in their proper positional relationship with the sliding top in its closed position, but can only be fixedly secured with the top in an open position, in accordance with a preferred embodiment, detent elements are provided which act to at least temporarily retain the guide plates in a position to which they have been adjusted without the securing element for the guide plates being engaged. The detent elements preferably are comprised of at least one lug which is engageable in a corrugation, one of the detents being on the guide plates, and the other being on guide pin carrying mounting plates.

9 Claims, 4 Drawing Figures

SLIDING ROOF FOR VEHICLES

BACKGROUND AND SUMMARY OF THE INVENTION

The invention relates to a sliding roof for automobiles with a sliding top sealing off a roof aperture in its closed position, which sliding top can be selectively lowered from this position by adjustment of an adjusting crosspiece guided in lateral guide rails and connected to the sliding top by way of swing-out levers and can be pushed underneath a fixed, rearward roof section, or can be swung out in an upward direction with its rear end above the fixed roof section; and with a mounting plate arranged at each of the lateral guide rails for a guide pin cooperating with a slotted crank guide of the respective swing-out lever.

Such a sliding roof is conventional (German Pat. No. 2,016,492). In such sliding roofs, constraining or guide plates have been additionally provided which are adjustable in the longitudinal direction of the lateral guide rails; during closing of the sliding top, a guide member fixedly joined to the sliding top contacts these guide plates to direct the closed slides top into its forward end position. The adjustment of the guide plates, absolutely necessary for the compensation of manufacturing tolerances, could be executed heretofore only by opening the sliding top and adjusting the guide plate visually and fixing the plate in this position. If it was then found after closing of the top that the position of the guide plate was not at an optimum, the adjusting process had to be repeated once and in some cases several times.

Therefore, it is an object of the present invention to construct a sliding roof of the aforementioned type so that an adjustment of the plates is possible with the sliding top being closed.

In accordance with a preferred embodiment disclosed herein, this object has been attained by providing that the guide pin mounting plate and the plate carry detent elements which cooperate with each other, by means of which the guide plate, after adjustment, can be at least temporarily retained in its respective position.

If, in a sliding roof having this construction, the adjustment of the guide plates is effected with the sliding top being closed, the detent elements retain the guide plates in the adjusted position during the subsequent opening of the sliding top, to finally fix the guide plates in the intended position. In this way, the adjustment of the guide plates can take place substantially faster and more accurately than heretofore.

To provide the detent elements, a corrugation cooperating with one or several lugs of the guide plate can be arranged advantageously on the underside of the guide pin mounting plate.

Relatively high adjusting forces are required, under certain circumstances, for the adjustment of the guide plates. To be able to provide such forces without effort, another feature of the preferred embodiment of the invention is to provide an abutment on the guide pin mounting plate for a tool to adjust the plate when the sliding top is closed.

To securely detain the detent elements of the guide pin mounting plate and the guide plate until final fixation in the intended position, the guide pin mounting plate is preferably connected to the associated lateral guide rail in a fixed manner in the zone of one of its ends and in a releasable fashion in the zone of its other end. The fixed connection takes care of a certain initial holding force for the detent elements. The final fixation of the guide plate then takes place by tightening the releasable connection of the guide pin mounting plate.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
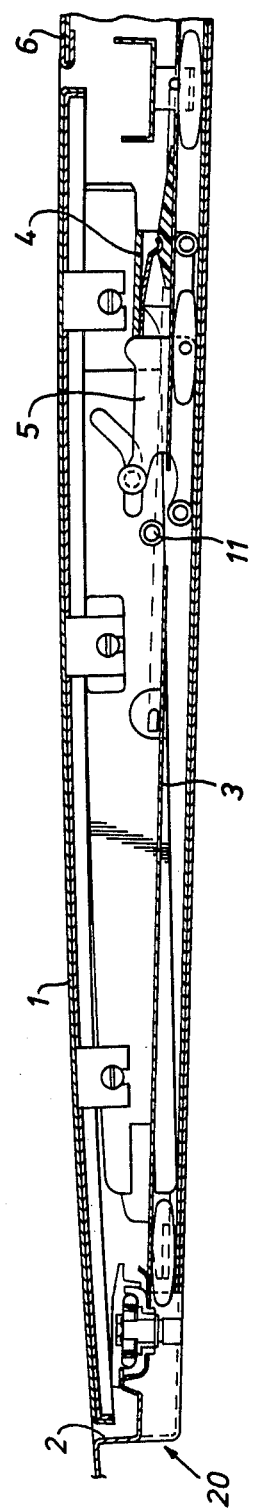
FIG. 1 is a longitudinal sectional view of a sliding roof.
Figure 2:
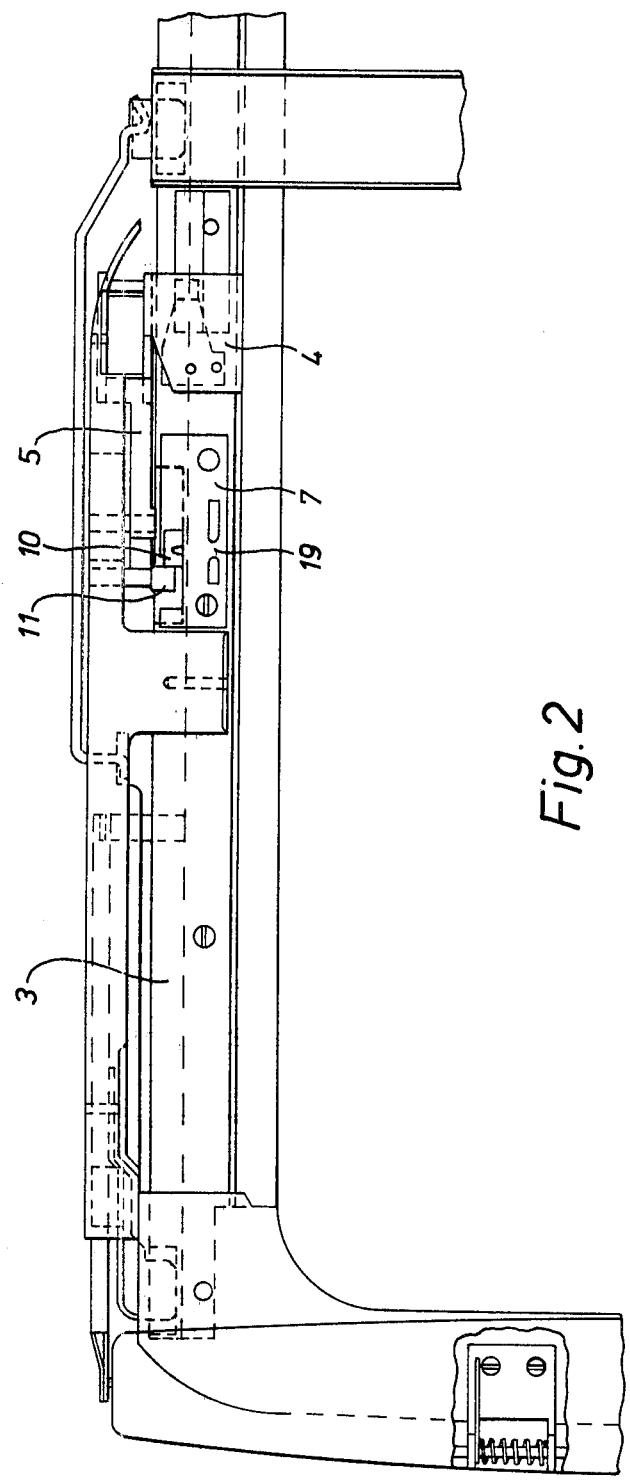
FIG. 2 is a partial top view of the sliding roof according to FIG. 1, the sliding top having been omitted.

The illustrated sliding roof comprises a sliding top 1 which seals the roof aperture 2 in its closed position. A slidable guide shoe carrier 4 is connected to the sliding top 1 by way of swing-out levers 5 and travels in lateral guide rails 3. By displacing the guide shoe carrier 4 (which is shown as a slidable crosspiece to which slide elements are attached), the sliding top 1 can be selectively lowered, starting with the closed position, and pushed underneath the fixed, rearward roof section 6, or it can be swung out in an upward direction to a position where its rear end is located above this roof section. (The manner in which such movements are achieved is known as are the specific structure details for achieving same, and as such, will not be described herein; but, to the extent necessary to complete an understanding of this invention, commonly assigned U.S. applications Ser. No. 10,468, filed Feb. 8, 1979, and Ser. No. 139,410, filed Apr. 11, 1980, with respect to both of which I am a co-inventor, are incorporated herein by reference). A mounting plate 7 for a guide pin 8 is arranged at each of the lateral guide rails 3; this guide pin cooperates with a slotted guide of the respective swing-out lever 5.

Furthermore, a plate 10 is provided which is adjustable in the longitudinal direction of the associated, lateral guide rail 3. During closing of the sliding top 1, a guide element 11, such as a roller pin, fixedly joined to the sliding top, contacts this guide plate. It is the task of the guide plates to guide the sliding top into its forward end position, especially to avoid that, during closing of the swung-out top, the rear edge of the top gets hung up at the rearward boundary of the roof aperture 2. The arrangement explained thus far is known and thus needs no additional description.

Figure 3:
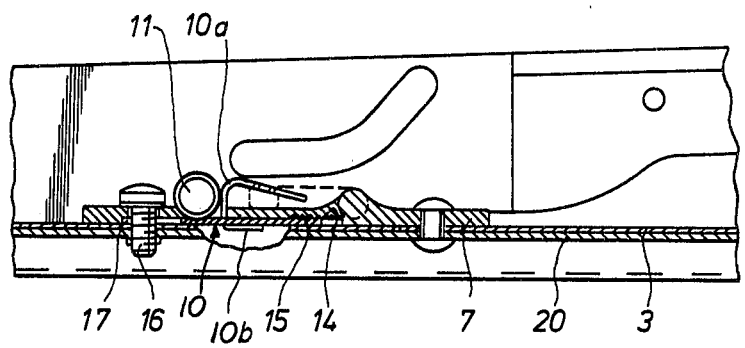
FIG. 3 shows a fragmentary view of FIG. 1 on an enlarged scale taken along line III—III of FIG. 4.
Figure 4:
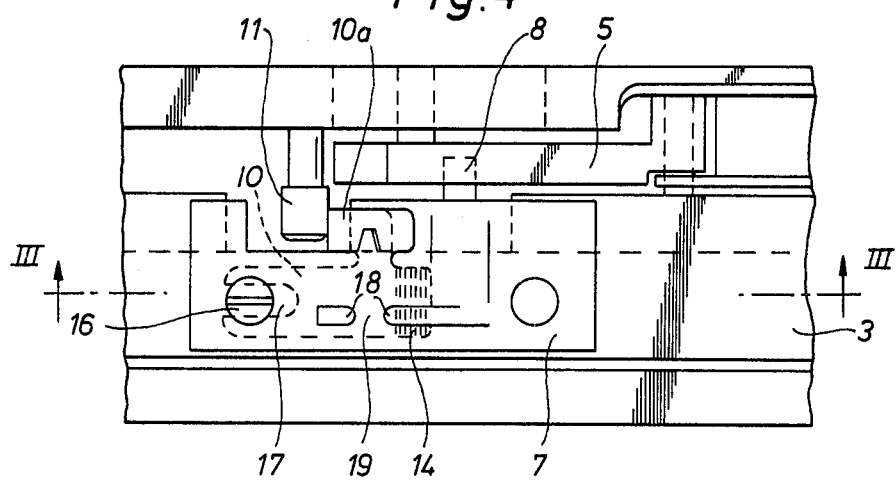
FIG. 4 shows a fragmentary view of FIG. 2 on an enlarged scale.

As can be seen from FIGS. 3 and 4, a corrugation 14 is provided on the underside of the guide pin mounting plate 7, lugs 15 on the topside of the part of the guide plate 10 lying underneath the mounting plate 7 cooperating with this corrugation. The mounting plate 7 is riveted, in the zone of its rear end, together with the associated lateral guide rail 3. In the zone of the front end of the mounting plate 7 a screw 16 extends through a hole of the mounting plate 7, a guide slot 17 of the guide plate 10, and a hole of the guide rails 3. The screw 16 is threaded into a roof frame 20 located underneath the guide rail 3. Abutments 18 are formed on the mounting plate 7, these abutments being spaced to provide access to a slot 19 formed in an angular arm portion 10a of plate 10. Angular arm portion 10a is integrally connected with a depressed portion 10b of plate 10.

To effect adjustment of the guide plate, the screw 16 is initially released. With the sliding top 1 in the closed position, a tool, for example, a screwdriver, is introduced between abutments 18 into the slot 19; by using abutments 18 as a fulcrum and the screwdriver as a lever, the plate 10 is urged to the forward direction until it contacts the guide element 11. By a cooperation of the lugs 15 of the guide plate 10 with the corrugation 14 of the mounting plate 7 and by the clamping effect of the riveting between the mounting plate and the guide rail, the guide plate 10 is securely held in the adjusted position upon the subsequent opening of the sliding top 1 to make the screw 16 accessible. By tightening of the screw 16, the final fixation of the guide plate 10 in the adjusted position is then accomplished.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Sliding roof for automotive vehicles comprising a fixed roof section with an aperture, a sliding top for sealing off the roof aperture in its closed position, said sliding top being connected by swing-out levers to slide shoes guided in lateral guide rails in a manner enabling said sliding top to be selectively lowered from its closed position and pushed underneath a fixed, rearward roof section by shifting of said slide shoes, or swung out in an upward direction to a position wherein a rear end of the top is above the fixed roof section; a mounting plate attached to each of the lateral guide rails and carrying a guide pin that cooperates with a slotted guide in a respective one of the swing-out levers; a guide plate mounted to each lateral guide rail so as to be adjustable longitudinally relative to the lateral guide rail and which causes said guide plate, during closing of the sliding top, to be contacted by a guide member that is fixedly connected to the sliding top for guiding the sliding top into its closed position, and disengageable securing means securing guide plates against movement relative to lateral guide rails when engaged characterized in that the guide pin carrying mounting plates and the guide plates have detent elements which cooperate with each other for at least temporarily retaining said guide plates in a relative position to which they have been adjusted without said securing means being engaged.

2. Sliding roof according to claim 1, characterized in that said detent elements comprise at least one lug and a corrugation.

3. Sliding roof according to claims 1 or 2, wherein said guide plate is arranged relative to all other components of said roof for enabling access thereto and said longitudinal adjustment thereof when said sliding top is in its closed position.

4. Sliding roof according to claim 3, characterized in that tool engageable means for effectuating said longitudinal adjustment of the guide plate is provided.

5. Sliding roof according to claim 4, wherein said tool engageable means comprises a slot in said guide plates and at least one abutment formed on said guide pin carrying mounting plates.

6. Sliding roof according to claims 1 or 2, characterized in that each guide pin carrying mounting plate is connected to a respective lateral guide rail in a fixed manner in a zone of one of its ends and in a releasable fashion in a zone of its other end.

7. Sliding roof according to claim 6, wherein the releasable connection of one end of the guide pin carrying mounting plate is formed by a tightening screw of which said securing means is comprised, each of said guide plates being secured, upon tightening of said screw, between a respective mounting plate and lateral guide rail.

8. Sliding roof according to claim 4, characterized in that each guide pin carrying mounting plate is connected to a respective lateral guide rail in a fixed manner in a zone of one of its ends and in a releasable fashion in a zone of its other end.

9. Sliding roof according to claim 8, wherein the releasable connection of one end of the guide pin carrying mounting plate is formed by a tightening screw of which said securing means is comprised, each of said guide plates being secured, upon tightening of said screw, between a respective mounting plate and lateral guide rail.

* * * * *